April 20, 1937.  A. KOMOW  2,077,937
PERFORATING AND CUTTING MACHINE
Filed Jan. 5, 1935  2 Sheets-Sheet 2
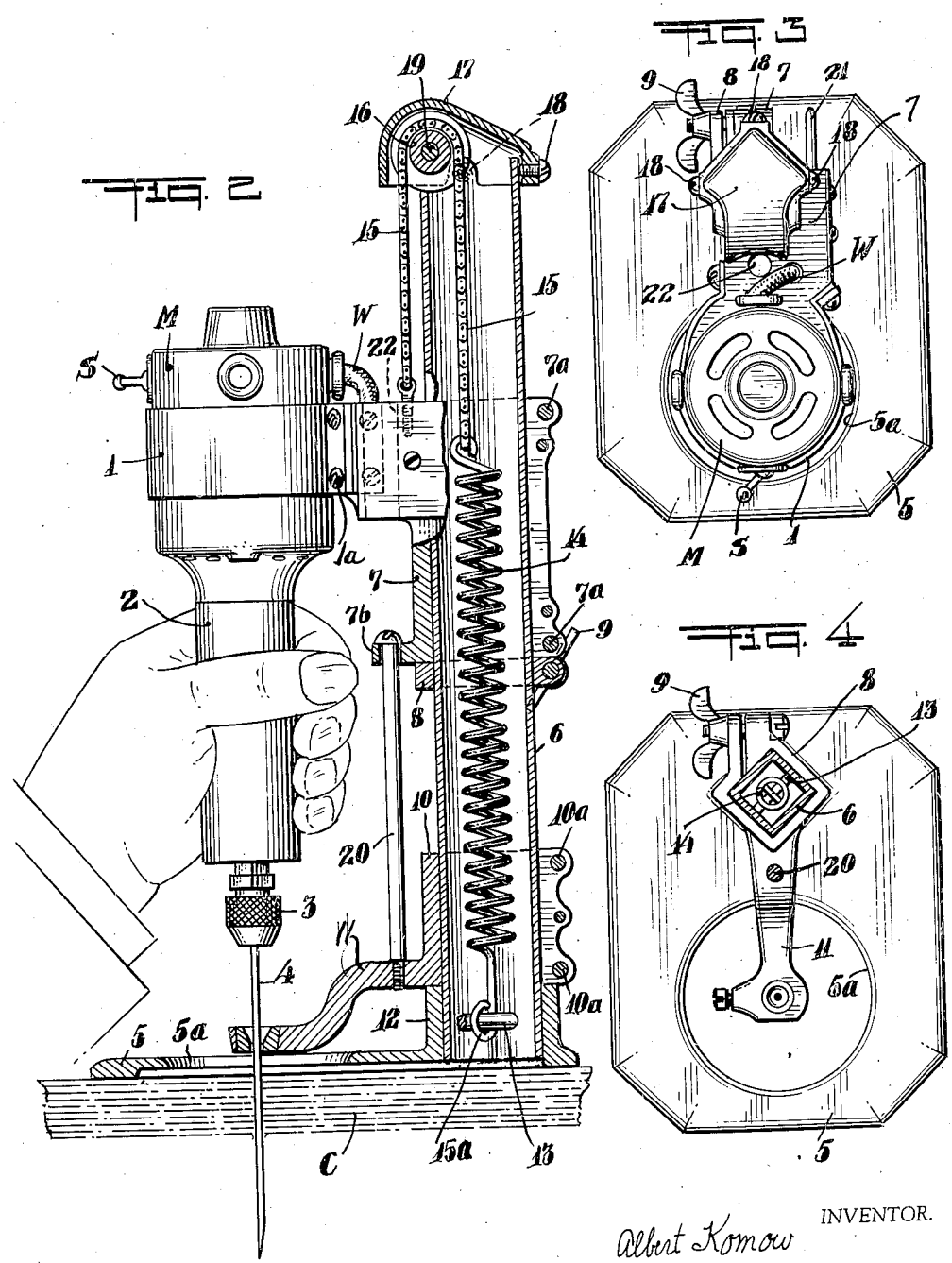
INVENTOR.
Albert Komow
BY Mock & Blum
ATTORNEYS Patented Apr. 20, 1937

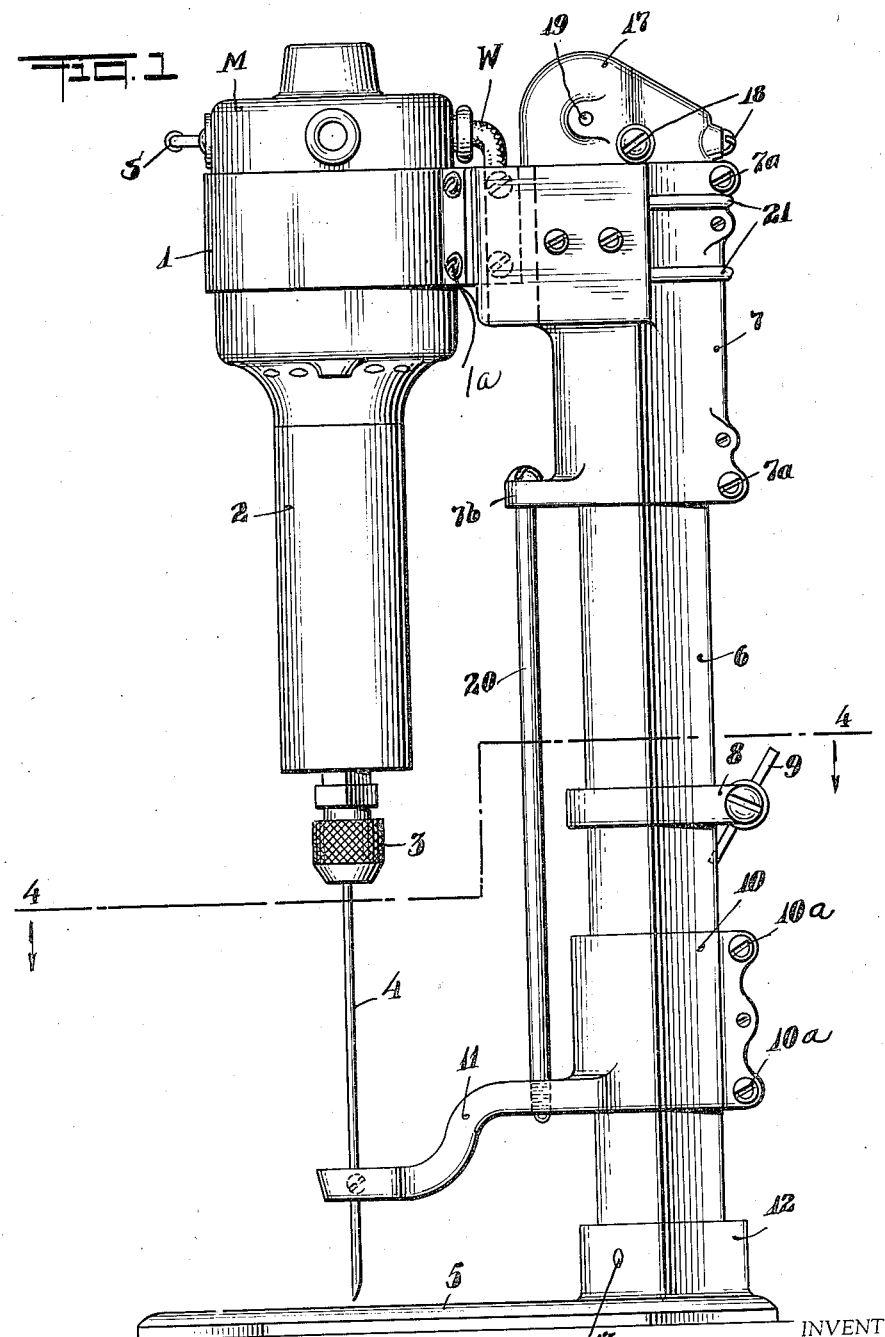

2,077,937

UNITED STATES PATENT OFFICE 2,077,937

PERFORATING AND CUTTING MACHINE

Albert Komow, New York, N. Y., assignor to U. S. Cloth Cutting Machine Co. Inc., New York, N. Y., a corporation of New York Application January 5, 1935, Serial No. 462

2 Claims. (Cl. 164—89.5)

My invention relates to a new and improved perforating and cutting machine.

One of the objects of my invention is to provide a simple and light portable machine which can be used for perforating and/or cutting cloth, in order to form suitable markings in the cloth.

Another object of my invention is to provide a machine in which the motor is moved together with the perforating or cutting tool.

Another object of my invention is to provide a suitable guide for the tool, said guide being so constructed and located that it will not obstruct the view of the cloth. Likewise, said guide will permit the free operation of the tool and the motor which operates the same.

Another object of my invention is to provide a machine of this kind in which the major parts consist of simple castings, so that the machine can be readily manufactured and assembled.

Another object of my invention is to provide a machine having an improved adjustable stop for the tool and/or motor, in order to limit the depth of penetration of the tool into the work.

Other objects of my invention will be set forth in the following description and drawings which illustrate a preferred embodiment thereof, it being understood that the above statements of the objects of my invention are intended to generally explain the same without limiting it in any manner.

Fig. 1 is a side elevation of the improved device.

Fig. 2 is a side elevation, partially in section, showing the tool and motor lowered so that the tool penetrates the work.

Fig. 3 is a top plan view of Fig. 1.

Fig. 4 is a sectional view on the line 4—4 of Fig. 1.

The device comprises a base 5 having a central opening 5a. The base 5 is integral with a hollow standard 12, which may have any suitable cross section. In this embodiment said cross section is square, but said cross-section may be circular or of any polygonal shape.

An upright 6 fits within the standard 12, and the upright 6 is connected to the standard 12 by means of any suitable fastening device 13, which may be a removable set-screw or the like.

As shown in Fig. 2, the bottom of the upright 6 is substantially at the same level as the adjacent bottom surface of the body of member 5. Likewise, and as shown in Fig. 1, the member 5 is provided at its periphery with a downwardly projecting flange, so that the bottom of the member 6 is spaced from the cloth C.

The cloth C may include any number of superposed layers.

A guide 10 is slidably mounted upon the member 6. Said guide 10 is in the form of a split sleeve, whose separated ends are connected by means of screws 10a. Said guide 10 is provided with an extension 11 and this extension 11 has a suitable opening through which the tool 4 passes. The guide 10 and its extension 11 can be formed from a single integral casting which is preferably made of aluminum or other suitable metal. Generally speaking, the metal parts of the device are preferably made of aluminum.

The guide 10 is provided with a pin 20 which is suitably connected thereto. For example, the lower end of the pin 20 may be externally threaded and said end engages an internally threaded bore of the member 11.

Said pin 20 passes through a suitable bore in a shoulder 7b of a casting 7, to which the motor M is connected. The casting 7 has the split-sleeve form previously mentioned and its ends are connected by means of screws 7a, so that the casting 7 is slidably mounted upon the member 6.

The electric motor M which may be of any suitable type, is provided with a switch S. Said motor M is connected to the casting 7 by means of a strap 1 which is removably connected to said casting 7 by means of screws 1a, or other suitable fastening members.

As shown in Fig. 3, the inner end of the casting 7 is provided with a concave face, which snugly abuts the corresponding cylindrical face of the casing of the motor M. The electric wires for supplying current to the motor M are formed into a cable W and this cable W enters the casting 7 and the wires of said cable are connected to suitable plug pins 21.

As shown in Figs. 2 and 3, a top casing 17 is clamped to the top of the member 6, by means of three screws 18. The casing 17 is provided with a shaft 19 upon which a pulley or sprocket 16 is turnably mounted. A chain 15 is removably connected to the top surface of the casing 7 and said chain 15 passes around the member 16 into the member 6 where the chain 15 is connected to a tension spring 14. The lower end 15a of the tension spring 14 is connected to a transverse pin 13 which is connected to the interior walls of the member 6.

A stop 8 is slidably mounted upon the member 6. This stop 8 also has separated ends, and a wing-nut and a suitable screw are provided for frictionally clamping the stop 8 in adjusted position relative to the member 6.

The casing of the motor is provided with a depending and non-turning sleeve 2, which is made of any insulating material. The armature shaft extends through said outer sleeve 2, and said shaft is provided with a chuck 3, to which the tool 4 is removably connected.

The operation of the device is as follows:—
The stop 8 is clamped to the member 6 in any suitable position. The operator then grasps the tube 2 and he lowers the motor M, which moves in unison with the slidable casting 7. The weight of the casting 10 causes it to follow the descending movement of the casting 7. In addition there is sufficient friction between the pin 20 and the bore of the shoulder 7b to cause the casting 10 to move downwardly, until it rests upon the top of the member 12, as shown in Fig. 2. The casting 7 is thus lowered until it abuts the stop 8, thus limiting the depth or the cut of the perforation. When the casting 10 abuts the top of member 12, the casting 7 can still be moved downwardly, since casting 7 can move relative to pin 20. The casting 7 overlies pin 20, so that if casting 10 does not move down freely, the bottom surface of casting 10 strikes the head of pin 20, thus impelling casting 10 to its bottom position, which is shown in Fig. 2.

When the tube 2 is released, the spring 14 and the chain 15 upwardly move the casting 7, until the top face of the casting 7 abuts the bottom face of the casting 17. In this position the member 10 is raised, so that the operator can clearly see the work and thus correctly position the tool 4.

The switch S can be moved to the circuit-closing position, either before or after the tool 4 contacts with the work.

As shown in Fig. 2, when the motor is in its bottom position, the chuck 3 does not contact with the guide 11, so that the free turning of the armature shaft is not hindered.

When the motor is in the upper position shown in Fig. 1, the center of gravity of the entire device is at about the level of the median horizontal line of holding-tube 2. Hence the device can be manipulated conveniently with one hand. Likewise, the center of gravity of the device is spaced from opening 5a, so that the rear of the device can be mounted on a table or the like, without tipping.

The clamping screws 10a and 7a make it possible to adjust the castings 10 and 7, in order to allow for wear.

That is, said castings 10 and 7 must fit closely and slidably upon member 6, in order to secure smooth and reliable operation. Since said castings 10 and 7 slide up and down during the operation of the machine, there is a certain amount of wear, which can be compensated by tightening the holding screws 7a and 10a. Said castings 10 and 7 may have some yield or resilience, in order to permit said adjustment, while permitting close sliding contact. It has heretofore been proposed to adjustably connect the motor of a drill to a standard, so that the height of the motor could be adjusted, or said motor could be moved down by automatic mechanism. In distinction, motor M and casting 7 are freely and manually slidable in a free path which is defined by upper and lower stops on the standard.

I have shown a preferred embodiment of the invention, but I do not wish to be limited to the details thereof. The individual electric motor M merely exemplifies any convenient source of power, and there may be considerable variation in the general mechanical design of the parts.

I claim:
1. A machine of the type described comprising a base having an opening therein, a hollow upright connected to said base, a spring located in said hollow upright, the bottom end of said spring being connected to said upright, a turnable member connected to said upright adjacent the top thereof, a flexible member connected to the upper end of said spring and passing around said turnable member, the outer part of said flexible member being connected to a motor having a depending shaft, and means for guiding said motor in its up and down movement relative to said hollow member.

2. A device of the type described, comprising a base having an opening therein, a hollow upright connected to said base, said upright having a top member connected thereto adjacent the top of said upright, a turnable member connected to said top member, a flexible member which passes around said turnable member, said flexible member having a part thereof exterior to said hollow upright and having a part thereof located within said hollow upright, a spring located within said hollow upright and connected to said flexible member, the bottom end of said spring being secured to said hollow upright, a first guide member slidably located upon the exterior of said hollow upright, said first guide member having the outer part of said flexible member connected thereto so that said spring serves to upwardly move said first guide member until it abuts said top member, an electric motor connected to said first guide member, the circuit of said electric motor including plug pins which are connected to said first guide member, said electric motor having a casing and also having a depending shaft which is substantially parallel to said hollow upright, a depending tube connected to the under side of said casing and through which said shaft passes, said shaft having a chuck which is located below the bottom end of said tube, a tool connected to said chuck, an adjustable stop located upon the exterior of said hollow upright and below the bottom surface of said first guide member, means for clamping said stop in adjusted position, a second guide member slidably mounted upon the exterior of said hollow upright and located below said stop, said second guide member having means for guiding said tool, and a headed pin connected to said second guide member, the shank of said pin passing slidably through an opening of the first guide member, stop means for limiting the downward movement of the second guide member, said second guide member being located above its respective stop means when the first guide member is in its top position.

ALBERT KOMOW.